(12) United States Patent
Nossing

(10) Patent No.: US 6,944,286 B1
(45) Date of Patent: Sep. 13, 2005

(54) GROUND KEY DETECTION CIRCUIT AND METHOD FOR INTERFERENCE-RESISTANT DETECTION OF THE ACTIVATION OF A GROUND KEY FOR TELEPHONES

(75) Inventor: Gerhard Nossing, Villach (AT)

(73) Assignee: Infineon Technologies AG, Munich (DE)

( * ) Notice: Subject to any disclaimer, the term of this patent is extended or adjusted under 35 U.S.C. 154(b) by 455 days.

(21) Appl. No.: 10/009,747

(22) PCT Filed: May 30, 2000

(86) PCT No.: PCT/DE00/01770
§ 371 (c)(1),
(2), (4) Date: Apr. 11, 2002

(87) PCT Pub. No.: WO00/76197
PCT Pub. Date: Dec. 14, 2000

(30) Foreign Application Priority Data
Jun. 7, 1999 (DE) .................. 199 25 886

(51) Int. Cl.⁷ .................................. H04M 9/00
(52) U.S. Cl. ............ 379/387.01; 379/377; 379/382.02; 379/416
(58) Field of Search .............. 379/387.01, 399.01, 379/403, 404, 413.02, 413.04, 1.01, 29.04, 379/145, 386, 416, 27.07, 24, 32.04, 382, 379/377, 394, 398

(56) References Cited

U.S. PATENT DOCUMENTS

| | | | | |
|---|---|---|---|---|
| 4,156,797 A | * | 5/1979 | Hoole | 704/233 |
| 4,320,260 A | * | 3/1982 | Lechner | 379/27.08 |
| 5,048,080 A | * | 9/1991 | Bell et al. | 379/165 |
| 5,511,118 A | * | 4/1996 | Gores et al. | 379/399.02 |
| 5,515,417 A | * | 5/1996 | Cotreau | 379/32.04 |
| 5,517,565 A | * | 5/1996 | Cotreau | 379/252 |
| 5,596,637 A | * | 1/1997 | Pasetti et al. | 379/399.02 |
| 5,659,570 A | | 8/1997 | Correau et al. | 375/5 |
| 5,774,316 A | * | 6/1998 | McGary et al. | 361/42 |

FOREIGN PATENT DOCUMENTS

JP 05-292158 11/1993 ........... H04M 1/00

* cited by examiner

Primary Examiner—Binh Tieu
Assistant Examiner—Tuan Pham
(74) Attorney, Agent, or Firm—Fish & Richardson P.C.

(57) ABSTRACT

A grounding key detecting device and method for interference-proof detection of the operation of grounding keys in telephones. A circuit that detects the operation of a grounding key includes a current detection device configured to detect a current flowing when the grounding key is in operation, a comparator configured to compare the detected current with at least one threshold value, and a monitoring circuit configured to detect a first period when the current exceeds the threshold value, detect a second period when the current drops below the threshold value, and output a grounding key detection signal when the first period is greater than the second period.

24 Claims, 4 Drawing Sheets

FIG 5
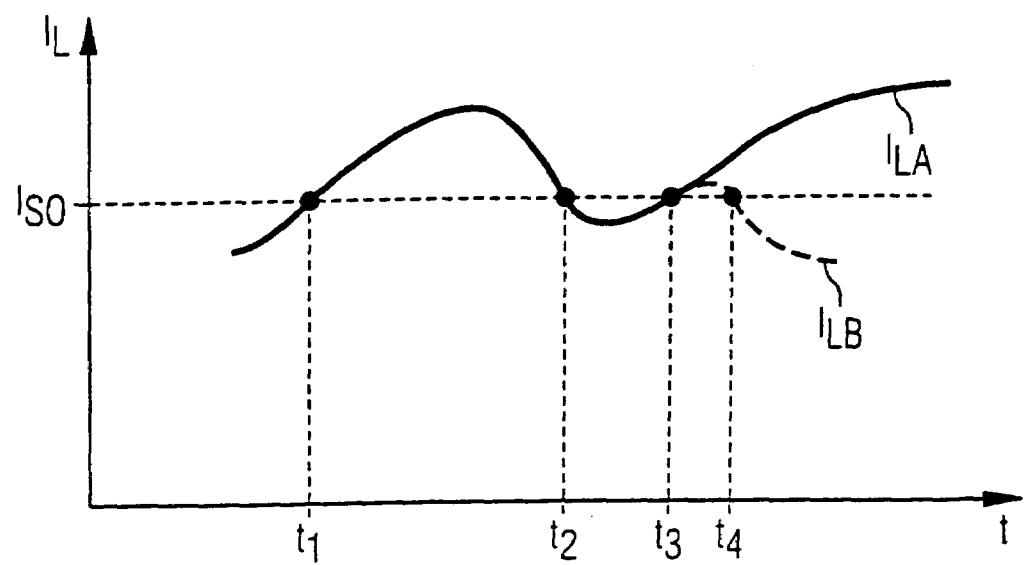
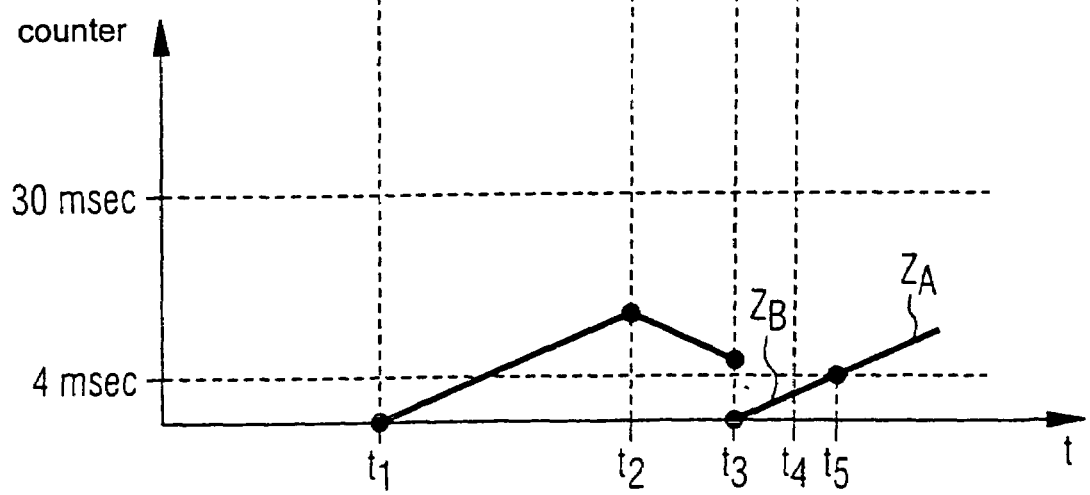

GROUND KEY DETECTION CIRCUIT AND METHOD FOR INTERFERENCE-RESISTANT DETECTION OF THE ACTIVATION OF A GROUND KEY FOR TELEPHONES

FIELD OF THE INVENTION

The invention relates to a grounding key detection circuit for interference-proof detection of the operation of a grounding key in a telephone and a corresponding method for interference-proof detection of the operation of a grounding key in telephones.

BACKGROUND

If an exchange line call has been set up in a telephone, a so-called inquiry call can be initiated by operating the grounding key. The exchange line interface maintains the existing call and switches the inquiries of the extension to an inquiry call subscriber line circuit. From the inquiry call subscriber line circuit, an internal call can be set up. The exchange line call can be transferred to another subscriber via this inquiry call path.

In digital switching systems, the telephone set is connected to an integrated semiconductor chip which handles the so-called BORSCHT functions. This integrated semiconductor circuit is generally called an SLIC (subscriber line interface circuit) circuit. "BORSCHT" is an artificial word to describe more easily the functions of a subscriber line circuit within a switching center. The word "BORSCHT" is composed of the initial letters of the designation for the various functions of such an SLIC semiconductor circuit. These functions include the battery feed, the overvoltage protection, the ringing, the signaling, the coding, the hybrid and the provision for testing.

In U.S. Pat. No. 5,659,570, an integrated SLIC circuit is described which contains a grounding key detection circuit. In this arrangement, the SLIC circuit is connected to the telephone set with grounding key via two telephone connecting lines, the grounding key detection circuit contained in the SLIC circuit detecting an unbalance of the currents flowing in the two connecting lines to output a grounding key detection signal when the grounding key is operated at the telephone set. The two currents flowing in the connections are in each case compared with reference currents which are generated by two reference current sources. The two reference currents generated by the reference current sources are of equal magnitude. If the current $I_T$ (T: tip) in the first telephone set connecting line is greater than the sum of the current $I_R$ (R: ring) flowing in the second telephone set connecting line and the reference current generated by the first reference current source or if the current $I_R$ flowing in the second telephone connecting line is greater than the sum of the current $I_T$ flowing in the first telephone connecting line and the reference current generated by the second reference current source, the grounding key detection circuit of the integrated SLIC circuit detects an operation of the grounding key of the telephone set and outputs a grounding key detection signal.

Though current interference signals on the telephone connecting lines do not lead to false grounding key detections, the imbalance of the currents $I_T$ and $I_R$ flowing in the telephone connecting lines must persist for a certain period of time. An imbalance of the two currents flowing in the telephone connecting lines is also called a longitudinal current. As soon as this longitudinal current exceeds a particular threshold current for a particular guard period, a grounding key detection signal is output in such conventional grounding key detection circuits.

In grounding key detection circuits according to the prior art, a disadvantage exists, nevertheless, in that sinusoidal current disturbances in the telephone connecting lines which are capacitively coupled into the lines could lead to the current threshold being undershot again for a short period of time before the period of guard time has elapsed. If, for example, the guard period is 4 ms and the detected longitudinal current drops below the current threshold due to a superimposed sinusoidal interference current before the guard period of 4 ms is reached, the operating of the grounding key is not detected even if the longitudinal current exceeds the current threshold again within a very short time after it has dropped below it. The capacitively injected sinusoidal interference currents can periodically push the longitudinal current produced below the threshold value at the wave dips due to the operating of the grounding key before the set guard time has in each case elapsed. The operating of the grounding key is not detected in such a case.

SUMMARY

It is the object of the present invention, therefore, to create a grounding key detection circuit and a corresponding method for detecting the grounding key operation in telephones, which circuit and method are interference-proof against injected alternating interference currents and reliably detect the operation of a grounding key even in the presence of injected alternating interference currents.

Further advantageous embodiments of the grounding key detection circuit according to the invention and of the method, according to the invention, for the interference-proof detection of the operation of a grounding key in telephones are specified in the subclaims.

The invention creates a grounding key detection circuit for interference-proof detection of the operation of a grounding key in a telephone comprising a longitudinal current detection device for detecting a longitudinal current flowing when the grounding key is operated, at least one comparator for comparing the detected longitudinal current with a threshold value, a monitoring circuit for monitoring the overshoot period for which the detected longitudinal current exceeds the threshold value and for detecting an undershoot period for which the longitudinal current drops below the threshold value, the monitoring circuit outputting a grounding key detection signal when the overshoot period is greater than the undershoot period.

In a preferred further development of the grounding key detection circuit according to the invention, said circuit contains a first comparator for comparing the detected longitudinal current with an upper threshold value and a second comparator for comparing the detected longitudinal current with a lower threshold value, the monitoring device detecting the overshoot period and the undershoot period of the two threshold values and outputting a grounding key detection signal when the overshoot period of the longitudinal current at the first comparator is greater than the undershoot period or when the undershoot period of the longitudinal current at the second comparator is greater than the overshoot period.

This provides the particular advantage that the operation of the grounding key can be reliably detected independently of the polarity of the longitudinal current flowing.

In a further advantageous embodiment of the grounding key detection circuit according to the invention, the monitoring circuit contains an internal up/down counter which counts up after the upper threshold value has been exceeded and counts down after the lower threshold value has been undershot.

This provides the special advantage that the time can be detected in a simple manner with minimum circuit expenditure.

In a further advantageous embodiment of the grounding key detection circuit according to the invention, the monitoring circuit contains an internal up/down counter which counts up when the lower threshold value has been undershot and counts down when the lower threshold value has been exceeded.

This provides the particular advantage that the operation of the grounding key can be detected in a simple manner and with minimum circuit expenditure independently of the longitudinal current caused thereby.

In a further preferred embodiment of the grounding key detection circuit according to the invention, the internal counter of the monitoring circuit performs the up/down counting process for a predetermined adjustable counting period after the upper threshold value has been exceeded or after the lower threshold value has been undershot.

This provides the particular advantage that the grounding key detection circuit can be adapted to the frequencies or time periods of the alternating current interference signals to be expected.

In a further advantageous embodiment of the grounding key detection circuit according to the invention, the adjustable counting period is set to half the period of an interference signal to be expected which has a maximum interference period and/or a minimum interference frequency, respectively.

This provides the special advantage that only the frequency corresponding to the frequency of the interference signal to be expected, which has a minimum interference frequency, needs to be set. The remaining interference signals with higher interference frequencies are automatically also suppressed and do not influence the detection process of the grounding key operation in the grounding key detection circuit according to the invention.

In a further advantageous embodiment of the grounding key detection circuit according to the invention, the adjustable counting period corresponds to half the period of interference signals having an interference signal frequency of 16⅔ Hz, 50 Hz, 60 Hz or 120 Hz.

When the adjustable counting period is set to half the period of a sinusoidal interference signal having a minimum interference frequency of 16⅔ Hz, this has the particular advantage that the remaining interference signals having interference signal frequencies of 50 Hz, 60 Hz or 120 Hz are also suppressed.

In a further advantageous embodiment of the grounding key detection circuit according to the invention, the upper threshold value is about +17 mA and the lower threshold value is about −17 mA.

In a further advantageous embodiment of the grounding key detection circuit according to the invention, the number of polarity changes of the longitudinal current is counted by a further internal counter of a polarity detection device within the monitoring circuit and, when a predetermined adjustable threshold count is exceeded, an external alternating current detection signal is output by the monitoring circuit.

This provides the special advantage that a faulty application of an external alternating current or of an external voltage to one of the two telephone connecting lines can be immediately detected.

In a further advantageous embodiment of the grounding key detection circuit according to the invention, the grounding key detection signal is only output after a predetermined adjustable guard period has elapsed.

In a further advantageous embodiment of the grounding key detection circuit according to the invention, the adjustable guard period is about 4 ms.

This provides the advantage that short-term disturbances can be suppressed and, at the same time, it is possible to suppress disturbances with frequencies of up to 120 Hz.

In a further advantageous embodiment of the grounding key detection circuit according to the invention, the expiry of the guard period is detected by the internal up/down counter of the monitoring circuit.

This provides the special advantage that the guard period can be detected in a simple manner without an additional separate counter.

In a further advantageous embodiment of the grounding key detection circuit according to the invention, the longitudinal current detection device is an integrated circuit for digital telephone switching (SLIC).

This provides the special advantage that the longitudinal current can be detected by means of standard integrated semiconductor chips.

BRIEF DESCRIPTION OF THE FIGURES

A preferred embodiment of the grounding key detection circuit according to the invention will be described for explaining features essential to the invention, referring to the attached drawings, in which:

FIG. 5 shows a third example of a signal variation of the longitudinal current and the associated counter signal variation for explaining the grounding key operation detection according to the invention.

FIG. 1 shows the basic configuration of the grounding key detection circuit according to the invention.

DETAILED DESCRIPTION

Figure 1:
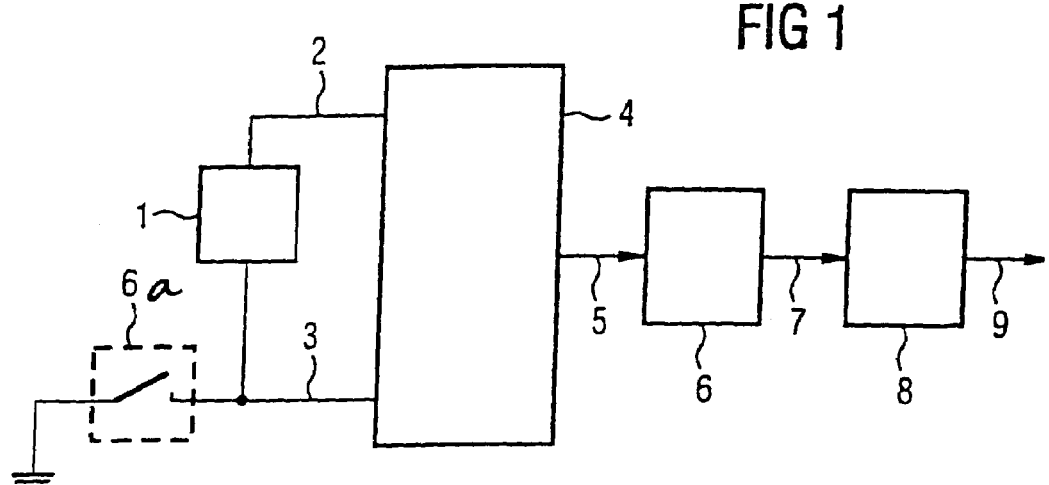
FIG. 1 shows a block diagram of the grounding key detection circuit according to the invention.

A telephone set 1 is connected to a longitudinal current detection device 4 via a first telephone connecting line 2 and via a second telephone connecting line 3. The second telephone connecting line 3 contains a branch-off node to which a grounding key 6a belonging to the telephone connecting set 1 is connected and is connected to ground. The longitudinal current detection device 4 is preferably an SLIC semiconductor circuit having an integrated longitudinal current detection function. The output of the longitudinal current detection device 4 is connected to a comparator 6 via an output line 5. The detected longitudinal current output via the output line 5 is compared with a threshold current value by the comparator 6. The comparator 6 is connected to a monitoring circuit 8 via an output line 7. The monitoring circuit 8 detects the overshoot period, i.e. the period for which the longitudinal current exceeds the current threshold value set, and the undershoot period, i.e. the period in which the longitudinal current drops below the current threshold value set, and outputs a grounding key detection signal via the line 9 when the overshoot period is longer than the undershoot period.

Figure 2:
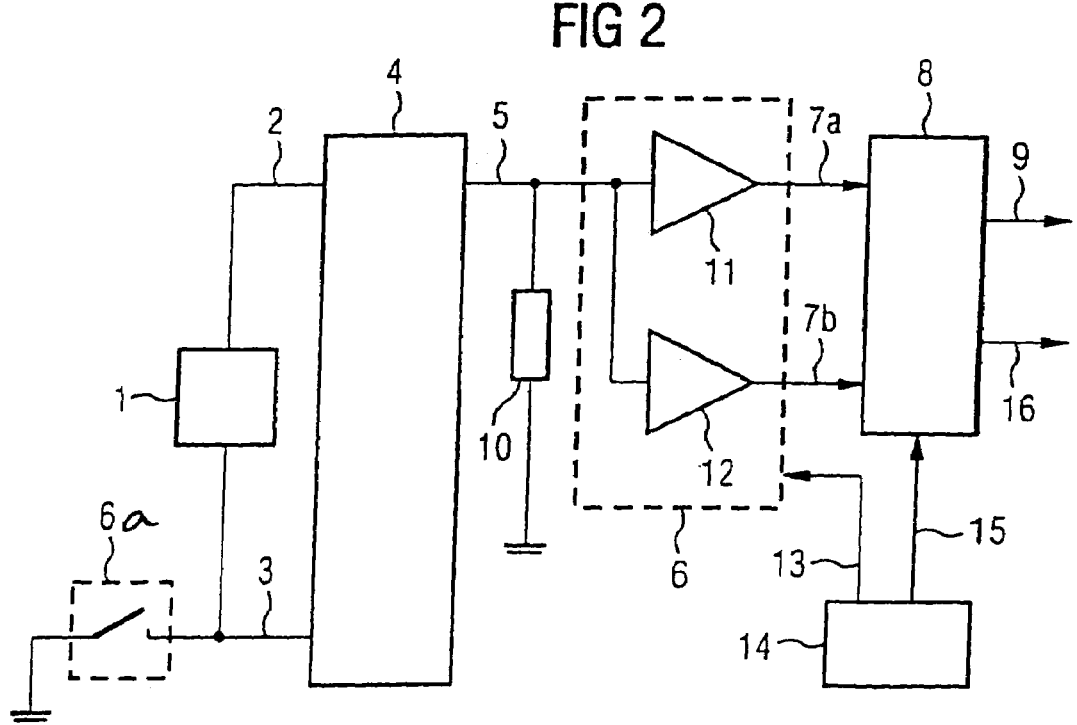
FIG. 2 shows a preferred embodiment of the grounding key detection circuit according to the invention, shown in FIG. 1.

FIG. 2 shows a preferred embodiment of the grounding key detection circuit according to the invention, shown in FIG. 1. Identical reference symbols designate comparable components.

The longitudinal current detected by the longitudinal current detection device 4 is converted into a measurement voltage by means of a current/voltage transformer 10 via the output line 5. As shown in FIG. 2, the current/voltage transformer preferably consists of a resistor connected to ground. The measurement voltage present across the resistor 10, which reproduces the longitudinal current which has occurred, is applied to two comparator circuits 11, 12 of the comparator. The inputs of the comparator circuits 11, 12 are connected to the output line 5 of the longitudinal current detection circuit 4. The comparator circuits 11, 12 of the comparator 6 compare the voltage present across the resistor 10 with adjustable threshold voltages.

In a preferred embodiment, the adjustable threshold voltages of the comparator circuits 11, 12 are connected to an input device 14 via an adjusting line 13. In this arrangement, the threshold voltages at the comparator circuits 11, 12 or, respectively, the threshold currents, can be adjusted by the input device 14. The comparator circuits 11, 12 of the comparator 6 have output lines 7a, 7b. If the longitudinal current present at the output line 5 of the longitudinal current detection device 4 exceeds an adjustable upper current threshold value at the telephone connecting lines 2, 3 of the telephone set 1, the comparator circuit 11 outputs a corresponding detection signal to the monitoring circuit 8 via the output line 7a. If the detected longitudinal current present at the longitudinal current detection device 4 undershoots a particular adjustable lower current threshold value, the second comparator circuit 12 outputs a corresponding detection signal to the monitoring circuit 8 via the output line 7b.

The monitoring device 8 detects the overshoot period and the undershoot period and outputs a grounding key detection signal via the output line 9 when the overshoot period of the longitudinal current output at the output line 5, which is detected by the first comparator circuit 11, is greater than the undershoot period of the longitudinal current, or when the undershoot period of the longitudinal current, which is detected at the second comparator circuit 12, is greater than the overshoot period.

For this purpose, the monitoring circuit 8 contains an internal up/down counter which counts up after the upper current threshold value has been exceeded and counts down when the upper current threshold value has been undershot. The monitoring circuit 8 also contains a second internal up/down counter which counts up when the lower current threshold value is undershot and counts down when the upper current threshold value is exceeded.

The monitoring circuit 8 is preferably connected to the input device 14 via adjusting lines 15. The internal counters of the monitoring circuit 8 perform the up/down counting process for a predetermined adjustable counting period after the upper threshold value has been exceeded or, respectively, after the lower threshold value has been undershot. The counting periods of the internal counters of the monitoring circuit 8 can be adjusted or set, respectively, via the adjusting line 15 with the aid of the input device 14 in accordance with the requirements of the grounding key detection circuit according to the invention.

The monitoring circuit 8 additionally contains a current polarity detection device by means of which the polarity changes of the longitudinal current are detected. For this purpose, the current polarity detection device contains another internal counter which outputs an external alternating current detection signal via the output line 16 of the monitoring circuit 8 when a predetermined threshold count is exceeded. If the polarity of the detected longitudinal current continuously changes, this is due to the fact that the telephone connecting lines 2, 3 of the telephone connection 1 have been accidentally connected to an external alternating voltage or are unintentionally in contact with such a voltage. The internal counter of the current polarity detection device is incremented to a target threshold value within a certain period which is inversely proportional to the frequency of the external voltage present. The frequency of the external alternating voltage present across connecting lines 2, 3 can be calculated, and indicated via a display device (not shown), by measuring this period, for example by means of an internal clock signal.

As already mentioned, the monitoring circuit contains a first internal up/down counter which counts up after the upper adjustable current threshold value has been exceeded and counts down after the adjustable upper current threshold value has been undershot, and a second internal up/down counter which counts up when the lower current threshold value has been undershot and counts down when the lower current threshold value has been exceeded. The period for which the up/down counting process is performed by the two internal counters is preferably set externally via the input device 14.

In a preferred embodiment, the adjustable counting period of the internal counters is set to half the period of a sinusoidal alternating current interference signal to be expected, which has a maximum interference period or, respectively, a minimum interference frequency. The minimum interference frequency of the interference signal to be expected is 16⅔ Hz, 50 Hz, 60 Hz or 120 Hz. These are the current-voltage frequencies of the rail network of the European alternating current system or of the American alternating current system. The adjustable counting period of the internal counters is preferably set to half the period of the rail network which has a minimum interference frequency of 16⅔ Hz, that is to say to 30 ms at a period of 60 ms. With this setting, the remaining interference frequencies of 50 Hz, 60 Hz and 120 Hz are also automatically suppressed. In a preferred embodiment, the upper current threshold value adjustable at the comparator is +17 mA and the lower current threshold value is −17 mA. The two threshold values are preferably balanced with respect to a zero current.

The grounding key detection signal output via the grounding key detection signal line 9 is preferably only output after a predetermined guard period, which is adjustable via an adjusting line 15, has elapsed. This guard period is preferably about 4 ms. The expiry of the guard period is detected by the internal up/down counters within the monitoring circuit 8.

In the text which follows, the operation of the preferred embodiment of the grounding key detection circuit according to the invention, shown in FIG. 2, will be explained, referring to FIGS. 3 to 5 for various signal variations of the longitudinal current I detected in the telephone connecting lines 2, 3.

Figure 3:
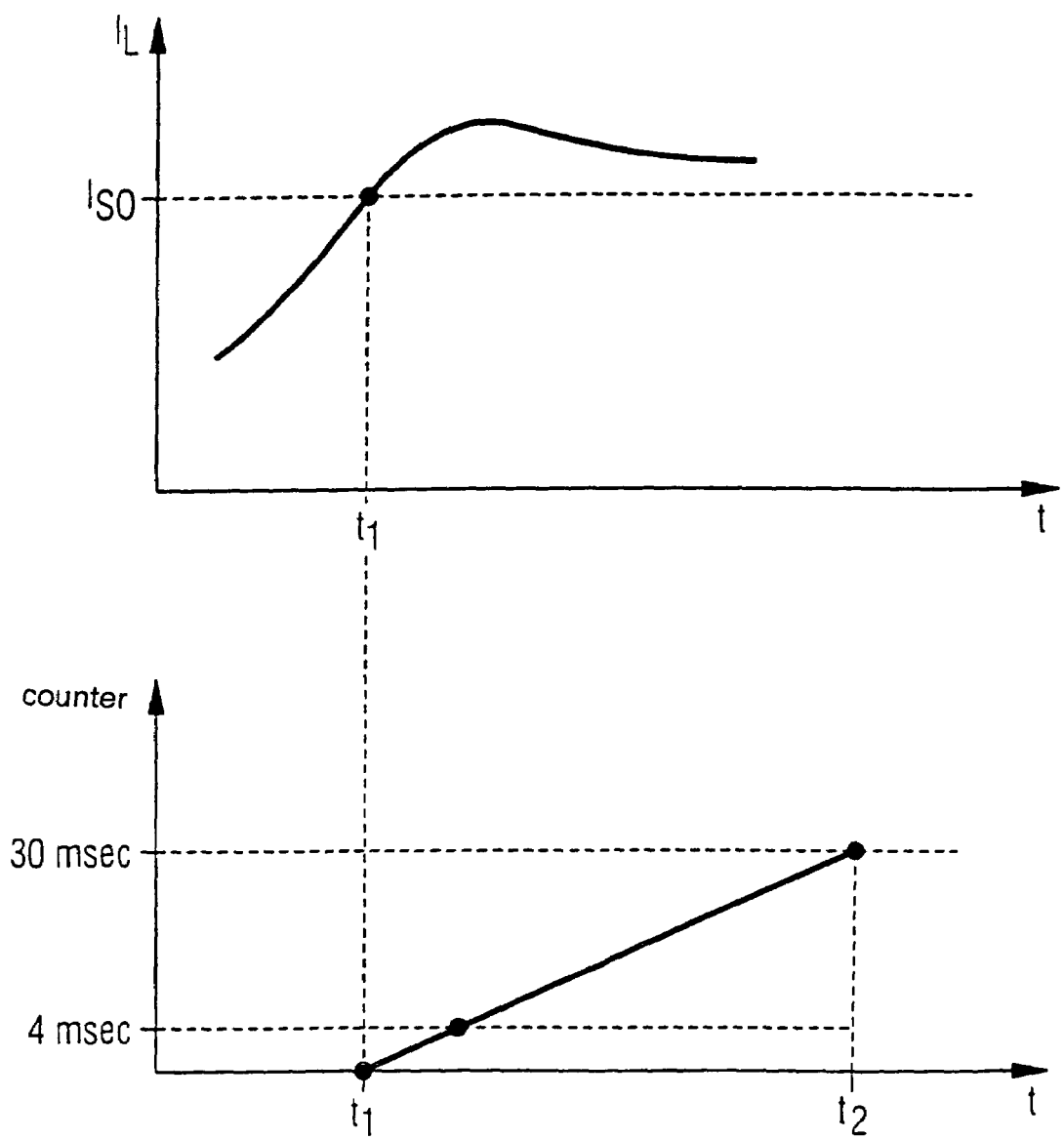
FIG. 3 shows a first example of the signal variation of a detected longitudinal current and the associated counter signal variation for explaining the grounding key operation detection according to the invention.

FIG. 3 shows the variation of a typical longitudinal current I in telephone connecting lines 2, 3 and the signal variation of an associated internal counter in the monitoring circuit 8.

After the grounding key 6a has been closed, an interference sensitive longitudinal current, which is detected by the longitudinal current detection device 4, arises at the telephone set connecting lines 2, 3 of the telephone connection 1. The longitudinal current detected at output connection 5 amounts to the difference between the current flowing in connecting line 2 and that flowing in connecting line 3 divided by a factor of 2. By closing the grounding key 6a, the longitudinal current $I_L$ indicates up to time $T_1$ at which it exceeds an upper current threshold value $I_{SO}$. This overshooting is detected by means of the first comparator circuit 11 in comparator 6 and a detection signal is output to the monitoring circuit 8 via this signal line 7a.

After the threshold overshoot by the longitudinal current $I_L$ has been detected, a first internal counter of the monitoring circuit 8 begins to count up, i.e. it is continuously incremented. Since the longitudinal current $I_L$ remains continuously above the upper current threshold value $I_{SO}$ in the example shown in FIG. 3, the internal counter continuously counts up until the adjustable counting period of 30 ms is reached at time $T_2$. At this time $T_2$, the monitoring circuit 8 detects the operation of the grounding key 6 and outputs a grounding key detection signal via the output lines 9.

Figure 4:
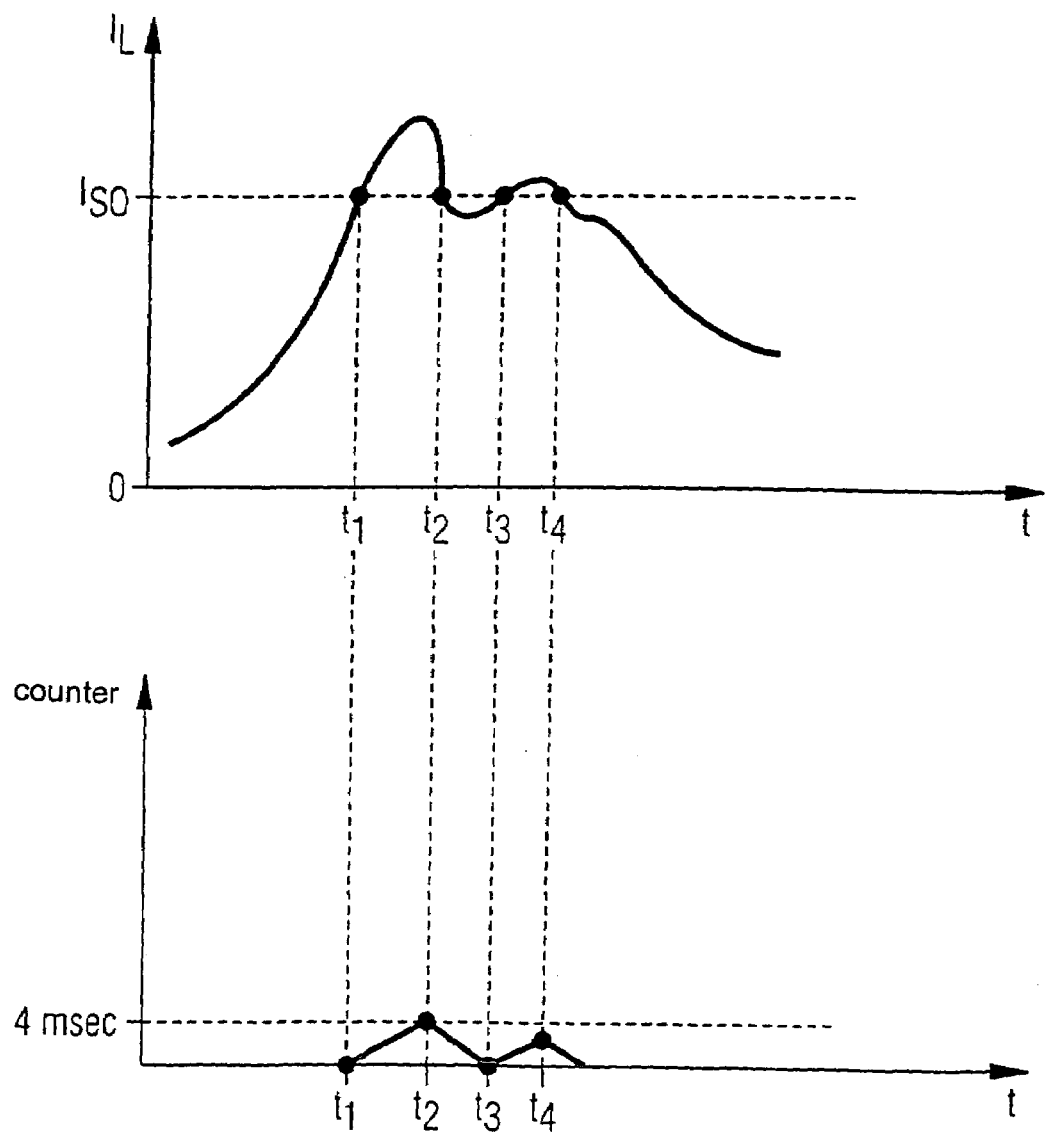
FIG. 4 shows a second example of the signal variation of a longitudinal current and the associated counter signal variation for explaining the grounding key operation detection according to the invention.

FIG. 4 shows another exemplary signal variation for the longitudinal current $I_L$ In the example shown in FIG. 4, the longitudinal current $I_L$ increases after the grounding key 6 has been closed and exceeds the upper current threshold value $I_{SO}$ at time $T_1$. However, the internal counter of the monitoring circuit 8 is incremented until the longitudinal current $I_L$ again drops below the upper threshold value at time $T_2$. The internal counter is constructed as up/down counter and is counted down again, or incremented, respectively, after the output threshold value is undershot. At time $T_3$, the longitudinal current $I_L$ again exceeds the upper threshold value $I_{SO}$ and the internal counter counts up again until the longitudinal current drops below the upper threshold value again at time $_{T4}$. After that, the internal counter is counted down to zero again in the example shown since the longitudinal current continuously remains below the upper threshold value.

In a preferred embodiment of the grounding key detection circuit according to the invention, a predetermined guard time can be additionally input into the monitoring circuit 8 via the adjusting line 15. In the example shown in FIG. 4, the guard time is 4 ms. Since the internal counter does not exceed the guard time of 4 ms at any point in the example shown in FIG. 4, no grounding key detection signal is output.

FIG. 5 shows by way of example the signal variation of the longitudinal current $I_L$ and the associated signal variation of the internal counter accommodated in the monitoring circuit 8.

In the example shown in FIG. 5, the longitudinal current $I_L$ exceeds the upper threshold value $I_{SO}$ at time $T_1$ as a result of which the internal counter is incremented. At time $T_2$, the longitudinal current drops below the upper threshold value and the direction of counting of the internal counter is reversed and it is decremented up to time $T_3$. At time $T_3$, the longitudinal current again exceeds the upper threshold value and remains above the upper current threshold value in the first variant $I_{LA}$ of the signal variation shown and drops below the upper current threshold value again at time $T_4$ in the second variant $I_{LB}$ shown.

As can be seen from FIG. 5, the counter is decremented at time $T_2$ when the upper current threshold value is undershot again, and at time $T_3$, at which the longitudinal current again exceeds the upper threshold value, a check is made whether the counter has a count of greater than zero, and this is stored. The counter is reset when the upper current threshold value is exceeded and again begins incrementing at time $T_3$.

In the second variant ($I_{LB}$), shown in FIG. 5, the counter is reset to zero after the upper current threshold value is undershot at time $T_4$. It is only after the adjustable minimum guard period is passed through again at time $T_5$ that a grounding key detection signal is output via the grounding key detection signal line 9 in the first variant ($I_{LA}$) of the signal variation of the longitudinal current $I_L$, shown in FIG. 5. Conversely, no grounding key detection signal is generated in the second variant $I_{LB}$ of the signal variation, shown in FIG. 5, in which the counter $Z_B$ is decremented again before the guard time of 4 ms has been reached.

The grounding key detection signal can preferably be produced by setting a grounding key detection bit or grounding key detection flag, respectively. The grounding key detection flag or grounding key detection bit set triggers, for example, a maskable interrupt procedure in the higher-level firmware.

As can be seen from the exemplary signal variation shown in FIG. 4, no grounding key detection signal is output when the overshoot period with which the longitudinal current exceeds the upper current threshold value $I_{SO}$ (period between time $T_1$ and $T_2$) is greater than the undershoot period with which the longitudinal current $I_L$ drops below the upper current threshold value $I_{SO}$ (period between time $T_2$ and $T_3$), because the adjustable guard time of 4 ms has not yet elapsed.

Thus, the grounding key detection device according to the invention makes it possible both to suppress sinusoidal interference currents in the grounding key detection and to retain a guard period.

Furthermore, external voltages present across the connecting lines can be detected and their frequency can be indicated.

Apart from the interference immunity with respect to sinusoidal current injections, the grounding key protection device according to the invention also provides protection against signal fluctuations due to switch bounce or due to transient processes.

What is claimed is:

1. A circuit for interference-proof detection in the operation of a grounding key, the circuit comprising:
   a current detection device configured to detect a current flowing when the grounding key is in operation;
   a comparator configured to compare the detected current with at least one threshold value,
   wherein the comparator includes:
      a first comparator circuit configured to compare the detected current with an upper threshold value; and
      a second comparator circuit configured to compare the detected current with a lower threshold value;
   a monitoring circuit configured to:
      detect a first period when the current exceeds the upper threshold value; and
      detect a second period when the current drops below the lower threshold value;
      output a grounding key detection signal when the first period is greater than the second period,
   wherein the monitoring circuit includes at least one internal counter configured to count up when the upper threshold value has been exceeded by the current and at least one internal counter configured to count down when the lower threshold value has not been exceeded by the current.

2. The circuit of claim 1 wherein the monitoring circuit is configured to output the grounding key detection signal when the first period of the current at the first comparator circuit is greater than the second period.

3. The circuit of claim 1 wherein the monitoring circuit is configured to output the grounding key detection signal when the second period of the current at the second comparator circuit is greater than the first period.

4. The circuit of claim 2 wherein the monitoring circuit includes at least one internal counter configured to count up when the lower threshold value has not been exceeded by the current and at least one internal counter configured to count down when the lower threshold value has been exceeded by the current.

5. The circuit of claim 4 wherein the internal counter is configured to perform a counting process for a predetermined period.

6. The circuit of claim 5 wherein the counting period is adjustable and configured to correspond to at least half of a period of an interference signal having a maximum interference frequency.

7. The circuit of claim 5 wherein the counting period is adjustable and configured to correspond to at least half of a period of an interference signal having a minimum interference frequency.

8. The circuit of claim 7 wherein the minimum interference frequency of the interference signal is a frequency from a group consisting of 16⅔ Hertz (Hz), 50 Hz, 60 Hz, or 120 Hz.

9. The circuit of claim 1 wherein the upper threshold value is positive 17 milli-Amperes (mA) and the lower threshold value is negative 17 mA.

10. The circuit of claim 1 wherein the monitoring circuit includes a polarity detection device configured to detect a polarity of the current.

11. The circuit of claim 10 wherein an internal counter of the polarity detection device is configured to count a number of polarity changes of the current.

12. The circuit of claim 11 wherein if a predetermined adjustable threshold count is exceeded, the polarity detection device is configured to output an external alternating current signal.

13. The circuit of claim 1 wherein the monitoring signal is configured to output the grounding key detection signal after a predetermined adjustable period has elapsed.

14. The circuit of claim 13 wherein the predetermined adjustable period is 4 milliseconds (ms).

15. The circuit of claim 13 wherein an internal counter of the monitoring circuit detects a lapse of the predetermined adjustable period.

16. The circuit of claim 1 wherein the current detection device is an integrated circuit for digital telephone switching.

17. A method for interference-proof detection in the operation of a grounding key, the method comprising:
    detecting a current flowing when the grounding key is in operation;
    comparing the detected current with an upper threshold value; and
    comparing the detected current with a lower threshold value;
    counting up when the current exceeds the upper threshold value and counting down when the lower threshold value exceeds the current.

18. The method of claim 17 further comprising outputting the grounding key detection signal when the first period is greater than the second period and a predetermined adjustable period has elapsed.

19. The method of claim 17 further comprising outputting the grounding key detection signal when the first period is greater than the second period.

20. The method of claim 17 further comprising outputting the grounding key detection signal when the second period is greater than the first period.

21. The method of claim 17 further comprising counting up when the lower threshold value has not been exceeded by the current and counting down when the lower threshold value has been exceeded by the current.

22. The method of claim 17 further comprising counting processes for a predetermined period.

23. The method of claim 22 further comprising adjusting the predetermined period to correspond to at least half of a period of an interference signal having a maximum interference frequency.

24. The method of claim 22 further comprising adjusting the counting period to correspond to at least half of a period of an interference signal having a minimum interference frequency.

* * * * *